J. B. BENTON.
WATER METER.
No. 46,990. Patented Mar. 28, 1865.
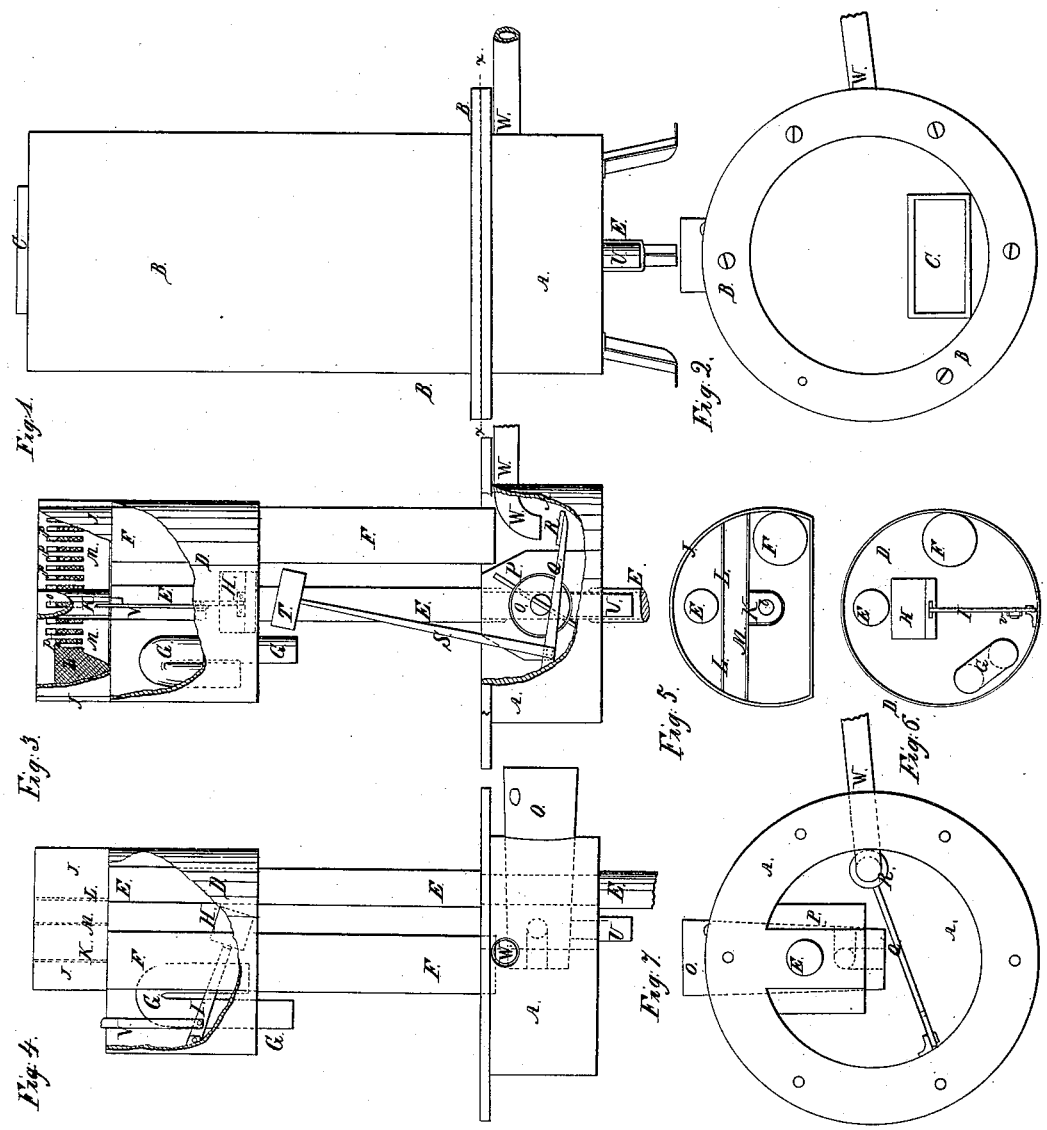

UNITED STATES PATENT OFFICE.

JOHN B. BENTON, OF NEW YORK, N. Y.

IMPROVEMENT IN WATER-METERS.

Specification forming part of Letters Patent No. 46,990, dated March 28, 1865; antedated March 12, 1865.

*To all whom it may concern:*

Be it known that I, JOHN B. BENTON, of New York, of the county of New York, in the State of New York, have invented a new and useful Improvement in Water-Meters; and I do hereby declare that the following is a full and exact description thereof, reference being had to the accompanying drawings, making part of this application.

Previous to my invention it has been customary to construct water-meters or machines for measuring and registering the quantity of water drawn from a given source, in such a manner that all the water which passed through the meter or machine was measured and the measure registered. Different mechanisms have been suggested and employed for carrying out this mode of operation in meters or machines for measuring a flow of liquid, the most common (and perhaps best) of which is that kind of machine in which the water in its passage through it moves a piston back and forth within a cylinder and discharges at each stroke of said piston, the quantity discharged at each stroke being equal to the capacity of the cylinder. The number of strokes being registered, the amount of water which passes through the meter in a given time is readily attained by multiplying this number by the capacity of the cylinder or the amount discharged at each stroke. Great objections exist to this method of measuring on account of the practical difficulty in many instances of measuring the whole amount of flow, and also on account of the costliness of an apparatus which is adapted to measure the entire flow of water and the inaccuracy and unreliableness under some circumstances of such machines. For instance, the moving piston must fit closely to its cylinder, or when the meter is put up to work under a strong head or pressure the water will pass by between the interior of the cylinder and the exterior of the piston; and again, if the piston work close, then much of the force or head of the water is expended in driving the meter.

My invention has for its objects to overcome all thes objections to meters as heretofore generally constructed, and to produce a machine which, while it affords the means of an accurate measurement of the entire flow of water through it, under any and all circumstances, shall be simple and very economic in its construction, and not subject to any of the difficulties in practice found to exist in all the meters hereinbefore alluded to; and to these ends my invention consists in a meter so constructed as to measure a given proportion only of all the water which flows or passes through the machine, which proportion is accurately determined and maintained by the machine, all as hereinafter more fully explained.

To enable those skilled in the art to make and use my invention, I will proceed to describe the construction and operation of my new meter, referring by letters to the accompanying drawings, forming part of this application, and in which—

Figure 1 is a front elevation of a water-meter constructed to operate in accordance with my invention. Fig. 2 is a top view of the same. Fig. 3 is an elevation similar to Fig. 1, but having the outer casing, which forms the air-chamber, removed and portions broken out to illustrate the internal mechanism more thoroughly. Fig. 4 is a side view with the air-chamber casing removed. Fig. 5 is a plan view of the upper reservoir. Fig. 6 is a plan view of the lower reservoir. Fig. 7 is a horizontal section at the line $x\ x$, Fig. 1.

In the several figures the same letter of reference indicates the same part of the machine.

The meter illustrated in the drawings is composed of a lower cylindrical portion, A, which may be mounted on suitable legs or supports, and over which is arranged a cylinder, B, bolted to it by suitable flanges, as shown. This cylinder B constitutes (in its greater portion) an air-chamber, and also envelops the mechanism of the meter and has in its top a glass, C, through which the dial of the registering mechanism may be observed. Within the cylinder B, and near its top, is an upper reservoir or chamber J, and connected to it, and immediately below it, is another reservoir, D, which I designate the "lower" reservoir.

E is the main or supply pipe by which the water is inducted to the upper reservoir, J, and F is the pipe through which the water is conducted after having been measured (as will be presently explained) to the lower portion, A of the meter, from whence it is drawn or passes off through a pipe, W. In the upper reservoir, J, is arranged a filter or sieve, L, and also a partition-plate, M, which is formed with numerous similar vertical slots or openings through it, o p p p, &c., through which the water flows. One of these slots, o, (the center one of the series,) is surrounded (on one side of the plate M) by a wall or plate in such manner as to form with plate M a chamber, K, (see Figs. 3 and 5,) in the bottom of which is an opening, l, communicating with the interior of the lower reservoir, D, into which all the water that passes into chamber K empties, where it is measured by means of a float, H, having its rods I V connected to suitable registering mechanism, (not shown,) and from whence it is periodically emptied or discharged by a siphon, G, which empties into the lower receptacle, A. The lower portion of the meter is formed with a valve-seat or cock-box, P, in which is arranged a several-way cock, O, by means of which the supply of water to the meter is cut off, and the meter emptied to prevent freezing, &c., as will be presently explained.

U is the waste pipe or exit for the emptying of the meter.

T is a float arranged within the case B and so connected by levers S Q with a valve, R, that the latter will be caused to close the mouth of the exit-pipe W, and stop the flow of water through the machine, in the event of the receptacle or interior of cases A B accumulating too much water, as will be presently explained.

The operations of the several parts and the whole machine may be thus described; the machine constructed as just explained and shown being set up, and the water or other main connected to the lower end of the tube E, the supply of liquid passes up into the upper reservoir, J, where it has first to filter through the screen L, and thence passes through the numerous slots o p p p &c. of the plate M. All the water that flows through the holes p p and into chamber Z (see Fig. 5) descend through the tube F into the bottom of the meter, while that portion of all the water which flows through the central one, o, of the slots in plate M passes down from chamber K through hole l into the lower reservoir. D, and as it accumulates in D raises the float H, which, through the medium of levers I V, operates a suitable "indicator" or measuring mechanism (not shown) until the water has risen to the bend of siphon G, (this quantity being indicated on the face of the register,) when the latter immediately empties the reservoir D of its entire contents, and the operation of filling up, registering, and emptying is repeated. The water measured, registered, and discharged from reservoir D falls down into the lower portion of the meter together with the larger portion which arrives there through the pipe F, as already mentioned, and from this receptacle the water passes off through tube W. That portion of the reservoir where the water enters from pipe E should be closed over tight, so that in cases where the water is under great pressure it will not flow over the tops of partition L M and destroy the perfect operation of the machine. The upper portion of the cylinder B constitutes an air-chamber, and the air confined therein exerts an equal pressure on the water in the upper and lower reservoirs, and in the lower receptacle, so that the whole is maintained in equilibrium, as is also the registering mechanism, which should be arranged within the case B, and may be made in any known and desirable manner, (it constitutes no part of my present invention.) In the event of the failure of the operation of this air-chamber, (by the obstruction of the air or its escape,) the water would fill up the whole meter and destroy its operation, but for an arrangement which I have provided to prevent such an accident—viz., should the water rise in the air-chamber to an undue height, it will effect the float T, so as to cause the valve R to stop the discharge of water through the meter until the evil is corrected, which may be done by simply turning the cock O, in such manner that the supply through pipe E shall be stopped and the contents of the lower portion of the meter be emptied or discharged through said cock and waste-pipe U, when the float will fall, valve R open tube W, and the machine will be again in working order, The valve O may be also employed to cut off the supply and empty the meter to avoid freezing.

It will be seen that by my improved method of constructing a meter I only measure a very small portion of the water which passes through the machine, whereby I am enabled to effect the measuring by a simple and economic plan, even where the entire flow is great, while at the same time the proportion (at all times and under all circumstances) that the measured portion bears to the unmeasured portion, is the same and known, so that by multiplying the amount registered (which comes through one slot, o) by the number of slots p the whole quantity of water which has passed through the meter is accurately and readily determined. It will be understood that the siphon G acts as an automatic emptier of the lower reservoir, D, for whenever the water in D reaches a level even with the bend of the siphon, the latter immediately discharges or draws off the whole contents of D, and it will be seen that this simple and effective automatic discharging arrangement may be employed with advantage independently of the other features of my invention.

Having fully explained the construction and operation of my invention, what I claim as new, and desire to secure by Letters Patent, is—

1. Constructing a meter, substantially as described, to divide the entire flow of water in given proportions and measure only a portion of the water which passes through the machine.

2. The employment, in combination with the measuring-reservoir, of a siphon arranged to operate as specified, and automatically discharge the contents of the reservoir, as set forth.

In testimony whereof I have hereunto set my hand and seal.

JOHN B. BENTON. [L. S.]

In presence of—
ANDREW I. TODD,
J. N. McINTIRE.